April 10, 1934. C. J. KOTCHI 1,954,009
ROD RECESSING AND COATING MACHINE
Filed Sept. 7, 1928 3 Sheets-Sheet 1
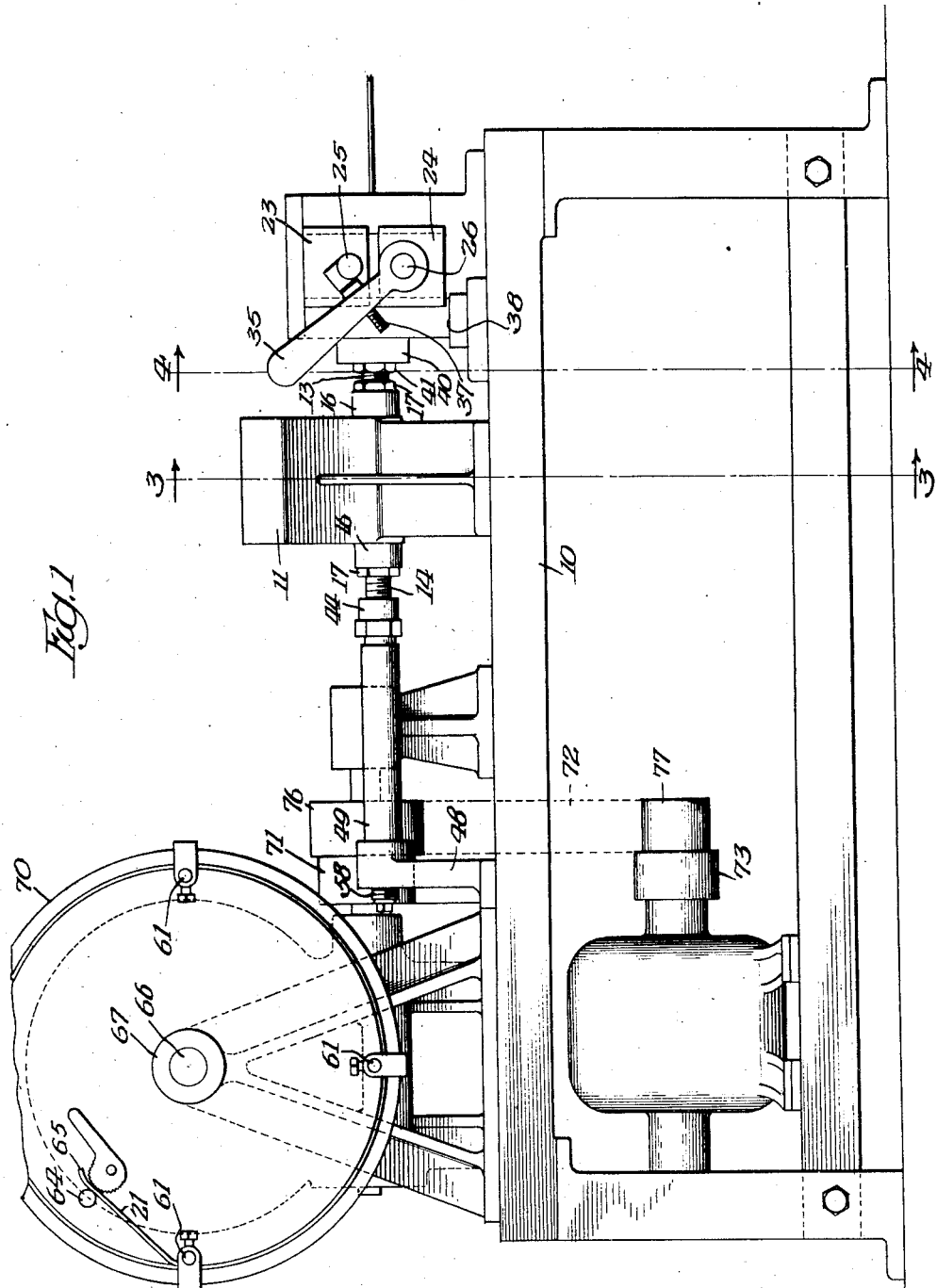
Inventor
Charles J. Kotchi
By [signature] Atty.

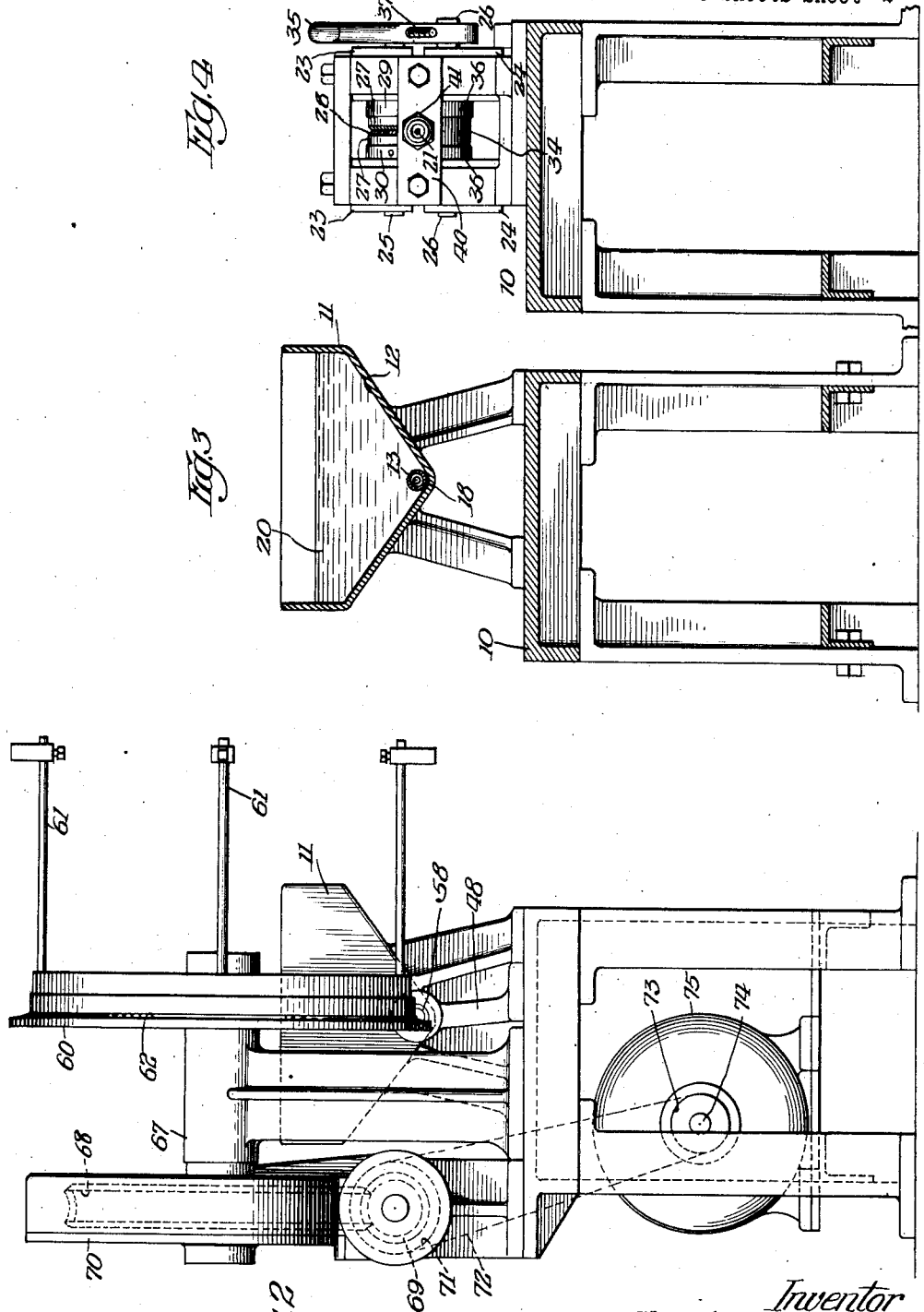

April 10, 1934. C. J. KOTCHI 1,954,009
ROD RECESSING AND COATING MACHINE
Filed Sept. 7, 1928 3 Sheets-Sheet 3
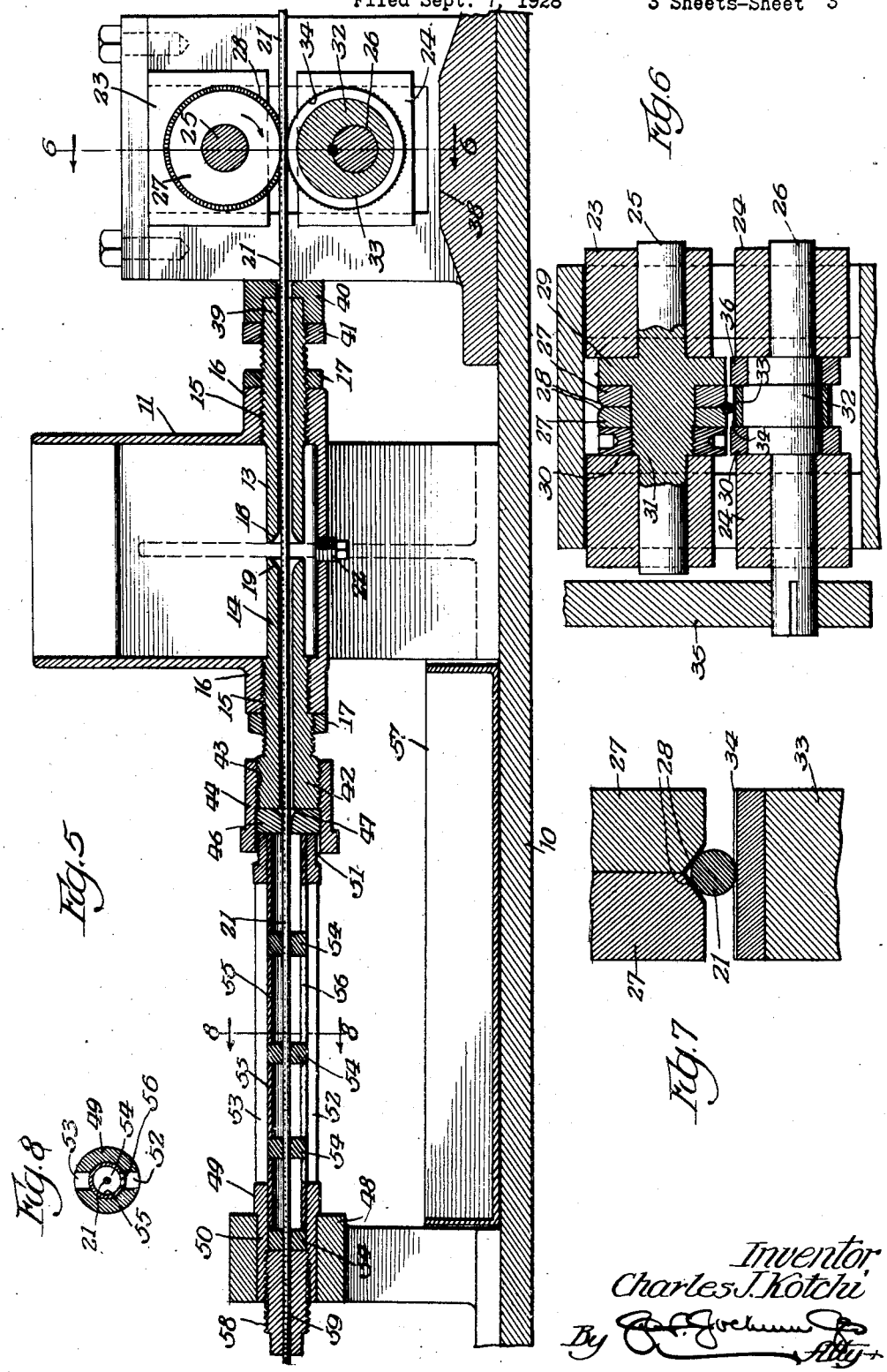
Inventor
Charles J. Kotchi Patented Apr. 10, 1934

1,954,009

UNITED STATES PATENT OFFICE 1,954,009

ROD RECESSING AND COATING MACHINE

Charles J. Kotchi, Chicago, Ill., assignor, by mesne assignments, to Una Welding Inc., Cleveland, Ohio, a corporation of Delaware Application September 7, 1928, Serial No. 304,603

5 Claims. (Cl. 29—33)

This invention relates to machines for manufacturing rods for welding purposes and in which rod is incorporated a flux so that as the rod is used and consumed flux in predetermined quantities will be automatically supplied to the work, the rod and flux dropping off in the form of pellets, whereby a continuous operation may be performed and the necessity of stopping the work or withdrawing the rod from the puddle to supply a quantity of flux will be avoided.

A further object is to provide an improved machine of this character in which the rod will be recessed or grooved at separated points or areas about its circumference, thereby distributing the heat generated during the recessing and shaping operation to diametrically opposite points in the rod.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a side elevation of a machine of this character constructed in accordance with the principles of this invention.

Figure 2 is a left hand end elevation of Figure 1, with parts omitted.

Figure 3 is a detail sectional view taken on line 3—3, Figure 1.

Figure 4 is a detail sectional view taken on line 4—4, Figure 1.

Figure 5 is a vertical, longitudinal sectional view of the machine, with parts omitted.

Figure 6 is an enlarged detail sectional view taken on line 6—6, Figure 5.

Figure 7 is an enlarged detail sectional view of portions of the recessing or shaping rollers.

Figure 8 is a detail sectional view taken on line 8—8, Figure 5.

Referring more particularly to the drawings the numeral 10 designates generally a suitable supporting structure upon which the machine is mounted, and arranged at any convenient point intermediate the ends of the structure is a tank or receptacle 11 which is preferably provided with a trough or V-shaped bottom 12 and projecting into the tank from opposite sides thereof are tubular members 13—14. Each of the members 13—14 is adjustably mounted such as by means of threads 15 in suitable bearings 16 and engaging the respective threads 15 of the members 13—14 are collars or nuts 17 which are adapted to abut the respective bearings 16 for holding the members 13—14 in position. The inner extremities of the members 13 and 14 terminate short of each other within the tank 11, but are preferably disposed in comparatively close proximity to each other. The extremity of the member 13 is provided with a conical recess 18, while the extremity of the member 14 is provided with a similar conical recess 19, these recesses being opposed to each other and serve as a means for directing the fluxing material 20, which is contained within the tank 11, into the recesses or cavities in the rod 21.

A clean out plug 22 may be provided in the bottom of the tank 11, if desired.

Arranged on one side of the tank 11 and mounted in suitable bearings 23—24 are shafts 25—26. The bearing 24 is freely movable toward and away from the bearing 23.

Loosely mounted upon the shaft 25 are a pair of recessing or shaping rollers 27, a portion of the periphery of each of which is beveled or inclined as at 28 to form a cutting or shaping edge. These two rollers or members 28 are secured in position and held with their inner faces in contact, by means of a collar 29 which is connected with the shaft 25 for rotation therewith, and an adjustable collar 30 which is threaded upon the shaft 25 by means of threads 31, the collar 30 co-operating with the collar 29 to clamp the rollers or members 27 therebetween.

Secured to the shaft 26 is an eccentric 32 and encompassing this eccentric is a roller 33, the periphery of which is provided with cutting surfaces or ribs 34. The bearings 24 in which the shaft 26 to which the eccentric 32 is secured, is movable toward and away from the bearing 23 and in order to effect this movement there is provided an operating handle 35 which is secured to the shaft 26. If desired collars 36 may be secured to the shaft 26 for holding the roller 33 in position and against longitudinal movement with respect to its shaft.

When the handle 35 is rocked the shaft 26 will be rocked and through the medium of the eccentric 32 the roller 33 will be moved toward and away from the rollers 27, according to the direction of operation of the handle.

A screw 37 may be provided and carried by the handle 35 for limiting the movement of the handle in one direction, and this screw is adapted to contact with a stop 38. Thus, by moving the handle 35 the rollers may be spread apart or brought together with respect to each other, as desired, so as to compensate operation upon the work and also varying sizes of diameters of the rods.

The end 39 of the member 13 projects into a bearing 40 and a nut or collar 41 engages the threads on the member 13 and abuts the bearing 40 for assisting in holding the member 13 in position. The member 13 as well as the member 14 are tubular and are arranged in alinement with the bite of the rollers 27 and 33, so that the rod 21 when it passes between the rollers 27—33 will enter the tubular member 13 and pass therefrom into and through the tubular member 14.

The end of the member 14 which is disposed outside of the tank 11 is preferably enlarged as at 42 and is provided with threads 43 about its periphery. A collar 44 is threaded upon the end 42 of the member 14 and projects therebeyond so as to form a recess in which a die 46 is seated. The opening is the die 46 is preferably enlarged as at 47 at the entrance end. A bearing 48 is mounted upon the support 10 and is arranged in alinement with the opening in the collar 44.

A tubular member 49 is supported by one end as at 50 by means of the bearing 48 and the other end 51 of the tubular member abuts the die 46 and assists in holding the latter in position. The collar 44 is adjusted upon the end 42 of the member 14 so as to extend over the end 51 of the tubular member 49 and the shoulder formed by the reduced end 50 of the member 49 abuts the bearing 48 for holding the tubular member 49 in position.

The tubular member 49 is preferably slotted at its bottom as at 52 and also at its top as at 53 for purposes to be hereinafter set forth, and these slots 52—53 extend lengthwise of the member 49.

Arranged within the member 49 are plurality of dies 54 similar to the dies 46, and are spaced for any desired interval lengthwise of the member 49. Spacer members 55 are arranged between the dies 54 to hold them separated and these spacer members are tubular and are provided with slots 56 opening through the bottom thereof. The rod 21 passes through the tubular member 49 and also the dies 54 after it passes from the tank 11. Any superfluous fluxing material which may adhere to the rod will be scraped off by these dies 54 and will fall through the open bottoms 56 of the spacer members 55 into a receptacle 57.

The end die 54 rests against an adjustable nut 58 which is threaded into the end of the tubular member 49 and is itself provided with an opening 59 therethrough in alinement with the opening in the members 13 and 14. By adjusting the nut 58 the dies 54 and spacer members 55 will be forced against each other and the die 46 will be forced against the end of the member 14.

The slot 53 provided in the top of the member 49 serves as a means whereby access may be had to the dies 54 and the spacer members 55.

The material 21, preferably in the form of a wire, is preferably fed from a reel and first passes between the rolls 27 and 33 to be recessed or shaped. The shaped wire then passes through the member 13, tank 11 and into the member 14 and while passing through the tank 11 will receive the flux 20 through which the wire passes, the flux flowing or entering the recesses or grooves made in the rod by the rollers 27—33.

The tapered tubular ends 18—19 of the members 13—14 serve as a means for directing the flux into the recesses and also for compacting the same therein. The rod then passes successively through the dies 46 and 54 and while passing through these dies the superfluous flux is scraped from the rod and will fall through the opening 52 in the member 49 to drop into the receptacle 57. The wire also passes through the opening 59 in the screw 58 and is then wound upon a reel which consists of a body portion 60 having arms 61 projecting laterally therefrom. The body portion 60 is beveled as at 62 to assist in reeling the wire. Carried by the reel 60 is a clamp 63 which co-operates with an abutment 64 to clamp the end 65 of the wire 21 to the reel.

The reel is rotatably mounted upon a shaft 66 journaled in a suitable bearing 67 and the reel may be rotated in any desired or suitable manner, preferably by means of a worm gear 68 with which a worm 69 meshes. The worm gear 68 may be encased within a housing 70 and the worm 69 may be driven by means of a pulley 71, over which a belt 72 passes. The belt also passes over a pulley 73 on the shaft 74 of a motor 75. If desired an additional set of pulleys 76—77 may be respectively connected with the worm 69 and the shaft 74 of the motor and on to which additional pulleys the belt 72 may be shifted for the purpose of imparting a different speed of rotation to the reel 60.

The wire is fed through the machine by the operation of the reel 60 and the winding of the completed wire thereupon. As the reel rotates the wire will be wound thereupon and will be drawn through the shaping rollers, flux containing tank and scraping dies.

By adjusting the lever 35 on the lower shaping roller 33, it will be manifest that any degree of pressure may be exerted upon the wire as it is passing between the shaping rolls.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a machine for manufacturing flux carrying welding rods, a flux containing tank through which a rod containing cavities is passed, a tubular member through which the rod passes after it leaves the tank, a plurality of dies within and disconnected from said tubular member and through which dies the rod is passed to remove excess flux, spacing means within and disconnected from the tubular member and disposed between the dies, means for clamping the dies and spacing members together, and means for continuously driving the rod through the tank and said tubular member, the lower portion of said tubular member being open to permit the flux that is removed from the rod to drop therethrough.

2. In a machine for manufacturing flux carrying welding rods, a flux containing tank through which a rod containing cavities is passed, a tubular member through which the rod passes after it leaves the tank, a plurality of dies within said tubular member, spacers also within said member and disposed between the dies, and means at the end of said tubular member for forcing said dies and spacers into engagement with each other, the upper portion of said tubular member being open to permit access to the said dies and spacer members.

3. In a machine for manufacturing flux carrying weld rods, a flux containing tank through which a rod containing cavities is passed, a tubular member through which the rod passes after it leaves the tank, a plurality of dies within said tubular member, and tubular spacers within said tubular member between the dies and through which spacers the rod also passes, and cooperating means at the ends of said tubular member for clamping the dies and spacer members in position, and through which last said means the rods pass, the bottom of said tubular and spacer members being open to permit escape of the flux which is removed from the rod.

4. In a machine for manufacturing flux carrying rods, a flux containing tank through which the rod passes, a tubular member projecting into the tank and also extending outside thereof and through which the rod passes, a support spaced from the tank, a tubular member mounted by one end upon the support, a collar adjustably carried by one end of the first said tubular member, the other end of the second said tubular member terminating adjacent the end of the first said tubular member, and a die disposed between said adjacent ends and through which die the rod passes, said collar being adapted to be projected over said die and the adjacent end of the second said tubular member, for securing the members together and the said die in position.

5. In a machine for manufacturing flux carrying rods, a flux containing tank through which the rod passes, a tubular member projecting into the tank and also extending outside thereof and through which the rod passes, a support spaced from the tank, a tubular member mounted by one end upon the support, a collar adjustably carried by one end of the first said tubular member, the other end of the second said tubular member terminating adjacent the end of the first said tubular member, a die disposed between said adjacent ends and through which die the rod passes, said collar being adapted to be projected over said die and the adjacent end of the second said tubular member, for securing the members together and the said die in position, additional dies in the second said tubular member, spacer members between the dies, and means adjustably mounted at the other end of the second said tubular member and co-operating with the end of the first said tubular member to clamp the dies and the spacer members in place.

CHARLES J. KOTCHI.